United States Patent
Singh et al.

(10) Patent No.: US 11,107,096 B1
(45) Date of Patent: Aug. 31, 2021

(54) SURVEY ANALYSIS PROCESS FOR EXTRACTING AND ORGANIZING DYNAMIC TEXTUAL CONTENT TO USE AS INPUT TO STRUCTURAL EQUATION MODELING (SEM) FOR SURVEY ANALYSIS IN ORDER TO UNDERSTAND HOW CUSTOMER EXPERIENCES DRIVE CUSTOMER DECISIONS

(71) Applicants: MeharPratap Singh, Bellevue, WA (US); Bo Han, Bothell, WA (US); Gagandeep Singh, Seattle, WA (US)

(72) Inventors: MeharPratap Singh, Bellevue, WA (US); Bo Han, Bothell, WA (US); Gagandeep Singh, Seattle, WA (US)

(73) Assignee: 0965688 BC LTD, Bellevue, WA (US)

( * ) Notice: Subject to any disclaimer, the term of this patent is extended or adjusted under 35 U.S.C. 154(b) by 333 days.

(21) Appl. No.: 16/454,341

(22) Filed: Jun. 27, 2019

(51) Int. Cl.
*G06Q 30/02* (2012.01)
*G06F 40/20* (2020.01)
*G06Q 10/00* (2012.01)

(52) U.S. Cl.
CPC ......... *G06Q 30/0203* (2013.01); *G06F 40/20* (2020.01)

(58) Field of Classification Search
CPC ............................ G06Q 30/0203; G06F 40/20
USPC ....................................................... 705/7.32
See application file for complete search history.

(56) References Cited

U.S. PATENT DOCUMENTS

| | | | |
|---|---|---|---|
| 10,599,700 B2 * | 3/2020 | Davulcu | G06F 40/247 |
| 2003/0154181 A1 * | 8/2003 | Liu | G06K 9/6226 |
| 2006/0041548 A1 * | 2/2006 | Parsons | G06F 16/954 |
| 2009/0192878 A1 * | 7/2009 | Lefang | G06Q 30/0203 |
| | | | 705/7.32 |
| 2009/0287076 A1 * | 11/2009 | Boyden | A61B 5/0059 |
| | | | 600/407 |

(Continued)

FOREIGN PATENT DOCUMENTS

JP    5504097 B2 *  5/2014

OTHER PUBLICATIONS

Jodie B. Ullman and Peter M. Bentler "Structural Equation Modeling", Handbook of Psychology, Second Edition, vol. 2. Research Methods in Psychology IV. Data Analysis Issues, 2012 (Year: 2012).*

(Continued)

*Primary Examiner* — Jonathan G Sterrett
*Assistant Examiner* — Abdallah A El-Hage Hassan
(74) *Attorney, Agent, or Firm* — Plager Schack LLP; Mark H. Plager; Stephen Hallberg

(57) ABSTRACT

A survey analysis process is disclosed for extracting and organizing dynamic textual content to use as input to structural equation modeling (SEM) for survey analysis in order to understand how customer experiences driver customer decisions. The survey analysis process applies natural language processing (NLP) to understand customers' open-ended comments and segment customers based on the topics. By doing this, open-ended questions can be handled in SEM. The survey analysis process then builds a structural equation model to evaluate how customers' real feelings affect their loyalty, satisfaction score, etc., which are measured as closed-ended questions in the survey. In this way, the survey analysis process enables SEM to handle customers' actual feelings.

10 Claims, 4 Drawing Sheets

(56) References Cited

U.S. PATENT DOCUMENTS

| | | | |
|---|---|---|---|
| 2014/0006317 A1* | 1/2014 | Hatami-Hanza | G06N 5/02 |
| | | | 706/11 |
| 2014/0280870 A1* | 9/2014 | Shrivastava | H04L 67/22 |
| | | | 709/224 |
| 2015/0220833 A1* | 8/2015 | Le | G06F 16/583 |
| | | | 706/16 |
| 2016/0124944 A1* | 5/2016 | Andreoli | G06F 40/51 |
| | | | 704/2 |
| 2016/0217792 A1* | 7/2016 | Gorodetski | G10L 17/04 |
| 2018/0173939 A1* | 6/2018 | Howe | G06K 9/00288 |
| 2018/0196778 A1* | 7/2018 | Glaser | G06F 17/18 |
| 2020/0104364 A1* | 4/2020 | Yin | G06F 40/289 |

OTHER PUBLICATIONS

Hae-Sang Park*, Jong-Seok Lee and Chi-Hyuck Jun "A K-means-like Algorithm for K-medoids Clustering and Its Performance", Department of Industrial and Management Engineering, POSTECH San 31 Hyoja-dong, Pohang 790-784, S. Korea, 2006 (Year: 2006).*

* cited by examiner

300

| | TOPICS AS COLUMNS | | | |
|---|---|---|---|---|
| ORIGINAL COMMENTS AS ROWS | IF TOPIC OCCURS IN SENTENCE: 1 OTHERWISE: 0 | ... | ... | ... |
| | 1 | 0 | ... | ... |
| | 0 | 0 | 1 | ... |
| | ... | ... | ... | ... |

US 11,107,096 B1

SURVEY ANALYSIS PROCESS FOR EXTRACTING AND ORGANIZING DYNAMIC TEXTUAL CONTENT TO USE AS INPUT TO STRUCTURAL EQUATION MODELING (SEM) FOR SURVEY ANALYSIS IN ORDER TO UNDERSTAND HOW CUSTOMER EXPERIENCES DRIVE CUSTOMER DECISIONS

BACKGROUND

Embodiments of the invention described in this specification relate generally to survey analysis, and more particularly, to a survey analysis process for extracting and organizing dynamic textual content to use as input to structural equation modeling (SEM) for survey analysis in order to understand how customer experiences driver customer decisions.

It is often a problem understanding how customers' experiences drive their decisions. Typically, organizations use surveys to find out about customers' experiences. When customers are not permitted to input open-ended answers or information, then surveys are limited in answer choices. As such, the surveys conform to structural equation modeling (SEM), which is a widely used survey analysis method, but which requires all variables in the survey to be measured. This is a problem that is commonly seen in the telecom industry and several other industries when open-ended feedback is desired in order to gauge customer experience and how customers' experiences drive their decisions.

Therefore, what is needed is a solution that integrates customers' actual experiences by analyzing the open-ended questions answered by customers in natural language, and therefore, using Natural Language Processing (NLP) to then analyze answers within SEM.

BRIEF DESCRIPTION

A novel survey analysis process for extracting and organizing dynamic textual content to use as input to structural equation modeling (SEM) for survey analysis in order to understand how customer experiences driver customer decisions is disclosed. In some embodiments, the survey analysis process for extracting and organizing dynamic textual content to use as input to SEM for survey analysis applies natural language processing (NLP) to understand customers' open-ended comments and segment customers based on the topics. By doing this, open-ended questions can be handled in SEM. In some embodiments, the survey analysis process for extracting and organizing dynamic textual content to use as input to SEM for survey analysis then builds a structural equation model to evaluate how customers' real feelings affect their loyalty, satisfaction score, etc., which are measured as closed-ended questions in the survey. In this way, the survey analysis process for extracting and organizing dynamic textual content to use as input to SEM for survey analysis enables SEM to handle customers' actual feelings or sentiments.

In some embodiments, the survey analysis process for extracting and organizing dynamic textual content to use as input to SEM for survey analysis performs a plurality of steps comprising cleaning raw open-ended question textual words, mapping textual words into numeric vector representations, such as by a tool word2vec, clustering words based on the numeric vector representations into a number of word clusters using a Gaussian mixture model, converting each open-ended question into a numeric vector by counting the occurrence of words in each word cluster, clustering open-ended questions into a number of sentence clusters using K Means clustering, defining the topics of each sentence cluster by the most frequent words, creating master data frame where all topics extracted from previous exercise as columns and comments as rows and setting topic column to one of non-null binary value (or one, "1") when the sentence belongs to that topic and null (or zero, "0"), developing first iteration of theoretical SEM diagram where a group of topics that belong to a similar category are loaded for the category, using recorded questions from the survey as the dependent variables for the structural equation model, running the structural equation model and finding statistically significant coefficients for each independent variable (topic category) on dependent variables (survey questions), further refining the structural equation model and eliminating topic categories and directly loading the topics on each survey question to identify major topics for each question separately, and reporting all topics with statistically significant impact on the survey questions.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
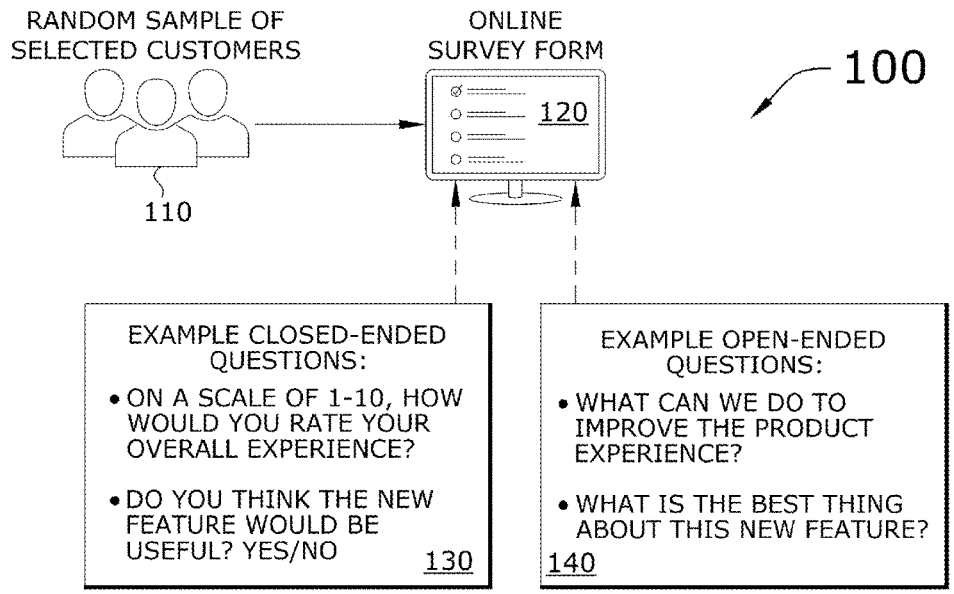
FIG. 1 conceptually illustrates a schematic view of an input gathering model in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel survey analysis process for extracting and organizing dynamic textual content to use as input to structural equation modeling (SEM) for survey analysis in order to understand how customer experiences drives customer decisions. In some embodiments, the survey analysis process for extracting and organizing dynamic textual content to use as input to SEM for survey analysis applies natural language processing (NLP) to understand customers' open-ended comments and segment customers based on the topics. By doing this, open-ended questions can be handled in SEM. In some embodiments, the survey analysis process for extracting and organizing dynamic textual content to use as input to SEM for survey analysis then builds a structural equation model to evaluate how customers' real feelings affect their loyalty, satisfaction score, etc., which are measured as closed-ended questions in the survey. In this way, the survey analysis process for extracting and organizing dynamic textual content to use as input to SEM for survey analysis enables SEM to handle customers' actual feelings and sentiments.

In some embodiments, the survey analysis process for extracting and organizing dynamic textual content to use as input to SEM for survey analysis performs a plurality of steps comprising cleaning raw open-ended question textual words, mapping textual words into numeric vector representations, such as by a tool word2vec, clustering words based on the numeric vector representations into a number of word clusters using a Gaussian mixture model, converting each open-ended question into a numeric vector by counting the occurrence of words in each word cluster, clustering open-ended questions into a number of sentence clusters using K Means clustering, defining the topics of each sentence cluster by the most frequent words, creating master data frame where all topics extracted from previous exercise as columns and comments as rows and setting topic column to one of non-null binary value (or one, "1") when the sentence belongs to that topic and null (or zero, "0"), developing first iteration of theoretical SEM diagram where a group of topics that belong to a similar category are loaded for the category, using recorded questions from the survey as the dependent variables for the structural equation model, running the structural equation model and finding statistically significant coefficients for each independent variable (topic category) on dependent variables (survey questions), further refining the structural equation model and eliminating topic categories and directly loading the topics on each survey question to identify major topics for each question separately, and reporting all topics with statistically significant impact on the survey questions.

Embodiments of the survey analysis process for extracting and organizing dynamic textual content to use as input to SEM for survey analysis described in this specification differ from and improve upon currently existing options. In particular, this is the first time that open-ended questions are used as variables in building SEM in survey analysis. This is improves upon the conventional methods in which SEM, as a widely used method in survey analysis, requires all variables in the survey to be measured, resulting in the fact that only closed-ended questions can be handled. In contrast, the survey analysis process for extracting and organizing dynamic textual content to use as input to SEM for survey analysis of the present specification provides a solution for integrating customers' actual experiences by analyzing the open-ended questions in NLP and then into SEM. By doing this, open-ended questions can be handled in SEM. Furthermore, measured variables from closed ended questions in the survey can be impacted by the survey designers significantly. The survey analysis process for extracting and organizing dynamic textual content to use as input to SEM for survey analysis is based on an approach that enables SEM to handle customers' actual feelings.

The survey analysis process for extracting and organizing dynamic textual content to use as input to SEM for survey analysis of the present disclosure may be comprised of the following elements and steps. This list of possible constituent elements and steps is intended to be exemplary only and it is not intended that this list be used to limit the survey analysis process for extracting and organizing dynamic textual content to use as input to SEM for survey analysis of the present application to just these elements. Persons having ordinary skill in the art relevant to the present disclosure may understand there to be equivalent elements or steps that may be substituted within the present disclosure without changing the essential function or operation of the survey analysis process for extracting and organizing dynamic textual content to use as input to SEM for survey analysis.

1. Clean raw open-ended question texts.
2. Map textual words into numeric vector representations (e.g., map all of the words in the corpus using a tool, such as word2vec).
3. Cluster words based on the numeric vector representations from Step 2 into a number of word clusters, using a Gaussian mixture model.
4. Convert each open-ended question into a numeric vector by counting the occurrence of words in each word cluster from Step 3.
5. Cluster open-ended questions into a number of sentence clusters using K Means clustering.
6. Define the topics of each sentence cluster by the most frequent words.
7. Create master data frame where all topics extracted from previous exercise as columns and comments as rows. Set topic column to non-null binary value (or one, "1") when the sentence belongs to that topic, otherwise set topic column to null (or zero, "0").
8. Develop first iteration of theoretical SEM diagram where a group of topics that belong to a similar category are loaded for the category.
9. Use recorded questions from the survey as the dependent variables for the structural equation model.
10. Run the structural equation model and find statistically significant coefficients for each independent variable (topic category) on dependent variables (survey questions).
11. Further refine the structural equation model and eliminate topic categories, and directly load the topics on each survey question, which helps to identify major topics for each question separately.
12. Report topics with statistically significant impact on each question to elaborate how the trends in those questions are related to the defined topics.

The various elements and steps of the process of the present disclosure may be related in the following exemplary fashion. It is not intended to limit the scope or nature of the relationships between the various elements or steps and the following examples are presented as illustrative examples only. In particular, the steps of the survey analysis process for extracting and organizing dynamic textual content to use as input to SEM for survey analysis can largely be conceptualized in two sections or parts (Part 1 and Part 2). Part 1 involves Natural Language Processing (NLP) and encompasses steps 1 through 6. Part 2 involves Structural Equation Modeling (SEM) and encompasses steps 7 through 12.

The survey analysis process for extracting and organizing dynamic textual content to use as input to SEM for survey analysis of the present disclosure generally works by applying NLP (in Part 1) to understand customers' open-ended comments and segment customers based on the topics. Then, in Part 2, the survey analysis process for extracting and organizing dynamic textual content to use as input to SEM for survey analysis builds a structural equation model to evaluate how customers' real feelings affect their loyalty, satisfaction score, etc., which are measured as closed-ended questions in the survey.

By way of example, FIG. 1 conceptually illustrates a schematic view of an input gathering model 100. As shown in this figure, a random sample of selected customers 110 are presented an online survey 120 that includes a plurality of questions comprising closed-end questions 130 and open-ended questions 140. Examples of the closed-ended questions 130 include, without limitation, scaled numeric questions (e.g., "On a scale of 1-10, how would you rate your overall experience?") and YES/NO questions ("Do you think the new feature would be useful? YES/NO"). Examples of the open-ended questions 140 include, without limitation, improvement feedback questions (e.g., "What can we do to improve the product experience?") and user experience questions (e.g., "What is the best thing about this new feature?"). By having a random sample of selected customers 110 take the online survey, there is a pool of input data from which topics can be extracted. With closed-end questions, the topics can be largely categorized and input can be mostly organized up-front, since there is only a limited number or limited options for response by any of the customers 110 taking the online survey 120. However, for open-ended questions, the customers' 110 answers can spread over a wide range, and therefore, topic extraction is an essential aspect of being able to organize dynamic input in structural equation modeling for survey analysis. Topic extraction is described next, by reference to FIG. 2.

Figure 2:
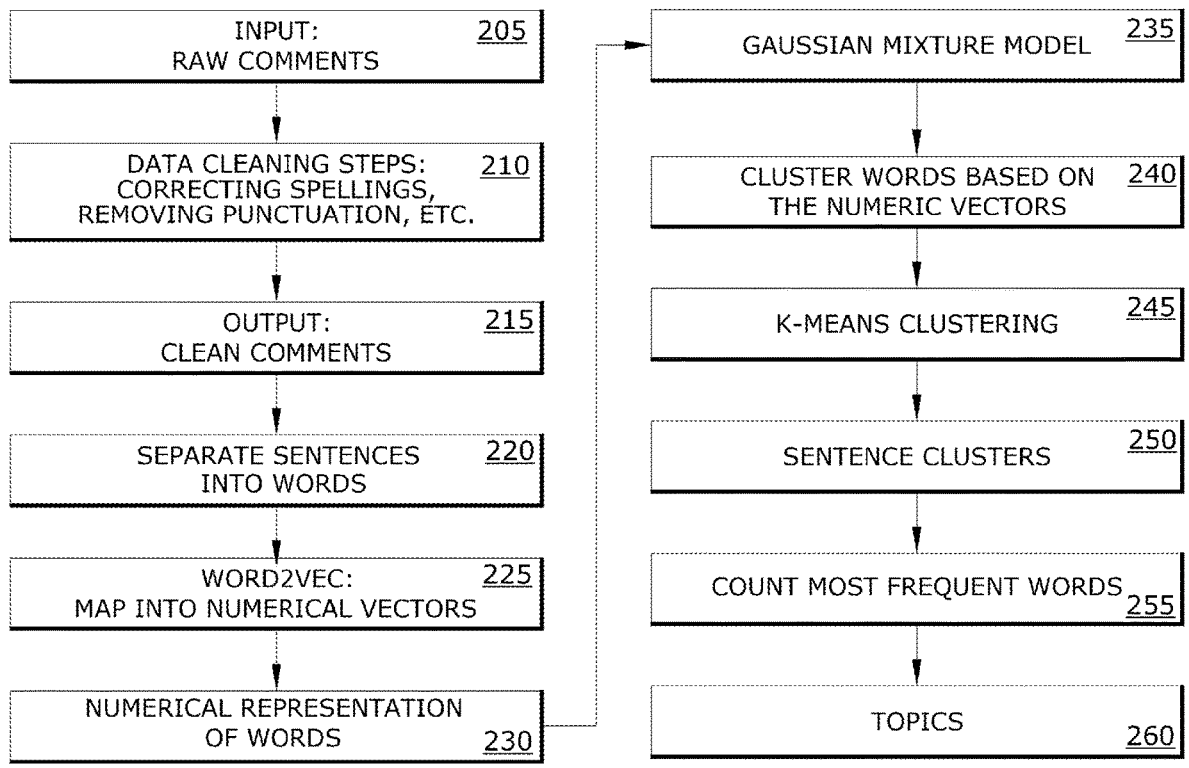
FIG. 2 conceptually illustrates a survey analysis process for extracting and organizing dynamic textual content to use as input to structural equation modeling (SEM) for survey analysis in some embodiments.

Specifically, FIG. 2 conceptually illustrates a survey analysis process 200 for extracting and organizing dynamic textual content to use as input to SEM for survey analysis. As shown in this figure, the survey analysis process 200 starts with receiving input from the survey forms (at 205). The input includes raw data (comments, answers, responses, and other raw input) in open-ended style (in response to open-ended questions). Next, the survey analysis process 200 performs data cleaning steps (at 210). The data cleaning steps include correcting spelling errors in the raw data input, removing punctuation marks, etc. After the raw data input is cleaned, the survey analysis process 200 continues to the next step of producing the clean comment data output (at 215).

In some embodiments, the survey analysis process 200 then separates (at 220) sentences from the clean comment data output into words. In some embodiments, the survey analysis process 200 uses a word2vec program to map the words into numerical vectors (at 225). In this way, the survey analysis process 200 produces numerical representation of words (at 230). In some embodiments, the survey analysis process 200 then feeds (at 235) the numerical representation of words into a Gaussian mixture model. Then the survey analysis process 200 clusters words (at 240) based on the numeric vectors. This is followed in some embodiments by the survey analysis process 200 using K-means clustering (at 245) and thereafter generating (at 250) sentence clusters. In some embodiments, the survey analysis process 200 is then able to count (at 255) the most frequent words and generate topics (at 260). Then the survey analysis process 200 ends.

With the topics extracted from the raw input data, it is possible to generate numerical vectors applied to sentence data. Thus, turning to another example, FIG. 3 conceptually illustrates a conversion chart of topics to numerical vectors 300. As shown in this figure, the conversion chart of topics to numerical vectors 300 includes several columns that represent the topics and several rows with original comments. Based on the extracted topics, original comments can be analyzed to see whether the topic in each column occurs within the sentence (comments) or not. When the topic does occur in a sentence of original comments, then the corresponding matrix box is set to a value of "1". On the other hand, when the topic does not occur in the sentence of the original comments, then the value is set to "0". The entire N×M matrix can be filled out to produce a matrix of binary values ("1" or "0").

Figures 3, 4:
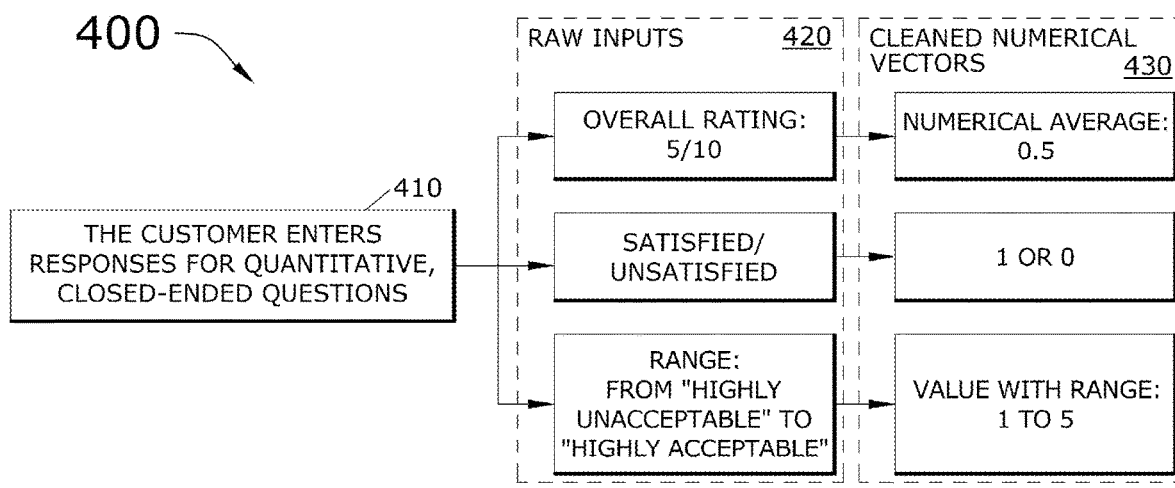
FIG. 3 conceptually illustrates a conversion chart of topics to numerical vectors in some embodiments.
FIG. 4 conceptually illustrates a schematic view of measured responses used as input for a structured equation model (SEM) in some embodiments.

Now turning to another example, FIG. 4 conceptually illustrates a schematic view of measured responses used as input for a structured equation model (SEM) 400. As shown in this figure, measured responses are based on closed-ended questions. Thus, a customer begins by entering responses 410 to quantitative, closed-ended questions. The raw input data 420 from the customer is organized based on the type of closed-ended or quantitative questions which correspond to the responses 410 entered by the customer. Examples of the types of raw input data 420 as responses and the types of the closed-ended questions include, without limitation, limited numeric input (e.g., "Overall Rating: 5/10"), single response to either/or question (e.g., "Satisfied/Unsatisfied"), and numeric range input data (e.g., "Range: from 'Highly Unacceptable' to 'Highly Acceptable'"). Next, cleaned numerical vectors 430 are generated based on the raw input data 420. In this example, the cleaned numerical vectors 430 include a "Numerical Average: 0.5" which corresponds to the "Overall Rating: 5/10" raw input data, "1 or 0" which corresponds to the "Satisfied/Unsatisfied" raw input data, and "Value With Range: 1 to 5" which corresponds to the "Range: from 'Highly Unacceptable' to 'Highly Acceptable'" raw input data entered by the customer.

Figure 5:
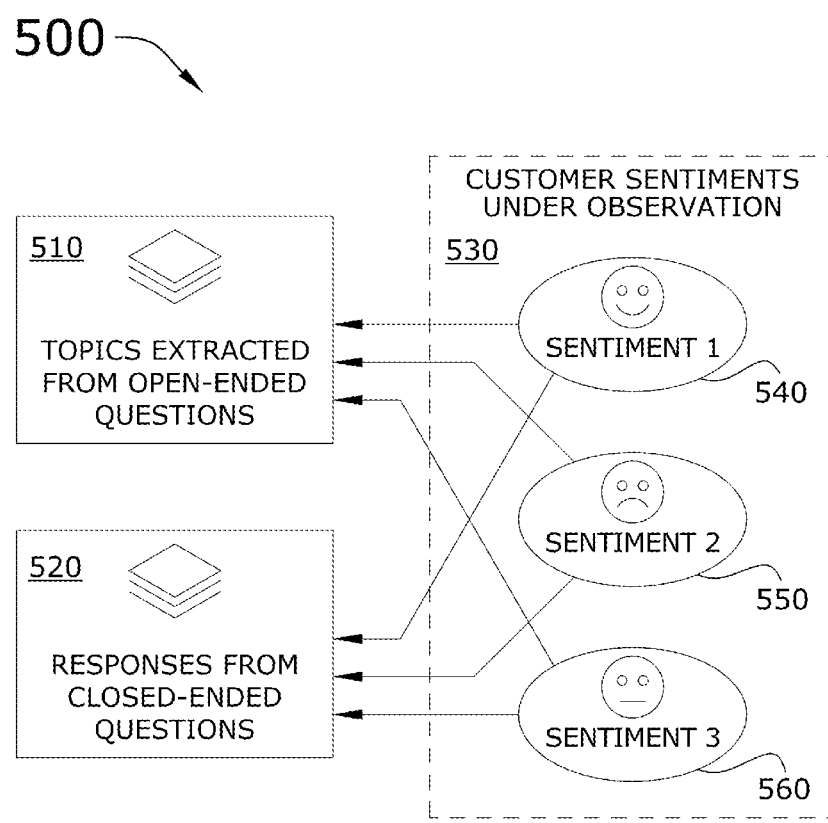
FIG. 5 conceptually illustrates a schematic view of an exemplary structured equation model (SEM) in some embodiments.

Finally, by way of example, FIG. 5 conceptually illustrates a schematic view of an exemplary SEM 500. As shown in this figure, the topics extracted from open-ended questions 510 and the responses from closed-end questions 520 exist within the SEM model outside of a set of customer sentiments under observation 530 applied to the SEM. The set of customer sentiments under observation 530 applied to the SEM in this example includes a positive sentiment 540 (e.g., a happy face emoticon labeled "Sentiment 1"), a negative sentiment 550 (e.g., a sad face emoticon labeled "Sentiment 2"), and a neutral sentiment 560 (e.g., a neutral face emoticon labeled "Sentiment 3"). Mappings are made between each of the customer sentiments in the set of customer sentiments under observation 530 and the topics from open-ended questions 510 as well as the topics from closed-ended questions 520.

To make the survey analysis process for extracting and organizing dynamic textual content to use as input to SEM for survey analysis of the present disclosure, knowledge of NLP and SEM would be needed and then one may design and develop software that implements the survey analysis process for extracting and organizing dynamic textual content to use as input to SEM for survey analysis to run on a computing device.

In this specification, the terms "software" and "program" are meant to include applications stored in magnetic storage, which can be read into memory for processing by a processor. In some embodiments, the software and/or program, when installed to operate on one or more electronic systems, define one or more specific machine implementations that execute and perform the operations of the software and/or program. In particular, the processes described above may be implemented as software processes and/or program processes (whether embedded program processes or application program processes) that are specified as a set of instructions recorded on a computer readable storage medium (also referred to as a non-transitory computer readable medium). When these instructions are executed by one or more processing unit(s), they cause the processing unit(s) to perform the actions indicated in the instructions. Examples of computer readable media include, but are not limited to, CD-ROMs, flash drives, RAM chips, hard drives, EPROMs, EEPROMs, etc. The computer readable media does not include carrier waves and electronic signals passing wirelessly or over wired connections.

Figure 6:
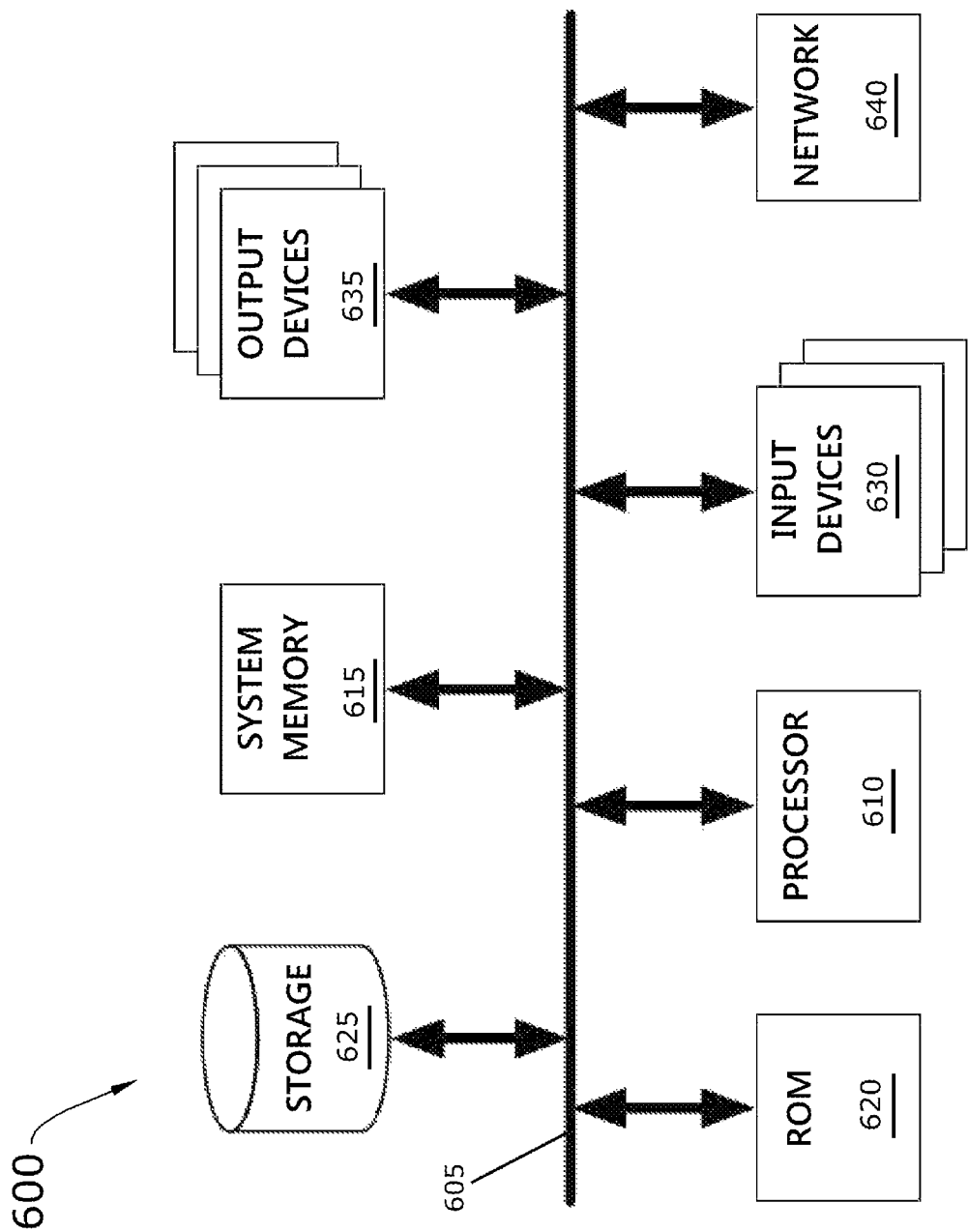
FIG. 6 conceptually illustrates an electronic system with which some embodiments of the invention are implemented.

By way of example, FIG. 6 conceptually illustrates an electronic system 600. The electronic system 600 may be any computing device, such as a desktop or laptop computer, a tablet, a smart phone, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A survey analysis process for extracting and organizing dynamic textual content to use as input to structural equation modeling (SEM) for survey analysis in order to understand how customer experiences driver customer decisions, said process comprising:

cleaning raw input data textual words;

mapping the clean textual words into numeric vector representations;

clustering words based on the numeric vector representations into a number of word clusters using a Gaussian mixture model;

converting the input data textual words into a numeric vector by counting the occurrence of words in each word cluster;

clustering open-ended questions into a number of sentence clusters using K Means clustering;

defining the topics of each sentence cluster by the most frequent words;

creating master data frame where all topics extracted from previous exercise as columns and comments as rows and setting topic column to one of a zero binary value when the sentence includes no words associated with the topic and a one binary value when the sentence includes a word associated with the topic;

developing a first iteration of a theoretical SEM diagram where a group of topics that belong to a similar category are programmatically loaded for the category;

using recorded questions as the dependent variables for the structural equation model;

running the structural equation model and finding statistically significant coefficients for each topic category independent variable on recorded question dependent variables;

further refining the structural equation model to eliminate topic categories;

directly loading the topics on each question to identify major topics for each question separately; and reporting topics with statistically significant impact on each question to elaborate how the trends in those questions are related to the defined topics.

2. The survey analysis process of claim 1 further comprising presenting an online survey form to a sample of select customers.

3. The survey analysis process of claim 2 further comprising receiving raw input data textual words as entered by the customers in response to open-ended questions of the online survey form.

4. The survey analysis process of claim 2 further comprising receiving raw input data textual words as entered by the customers in response to closed-ended questions of the online survey form.

5. The survey analysis process of claim 2, wherein using recorded questions as the dependent variables for the structural equation model comprises using recorded questions from the online survey form.

6. The survey analysis process of claim 1, wherein mapping the clean textual words into numeric vector representations comprises using a programmatic word2vec tool.

7. The survey analysis process of claim 1, wherein cleaning raw input data textual words comprises identifying and correction spelling errors.

8. The survey analysis process of claim 7, wherein cleaning raw input data textual words further comprises identifying and eliminating punctuation input data.

9. The survey analysis process of claim 1, wherein the theoretical SEM diagram comprises a plurality of customer sentiments.

10. The survey analysis process of claim 9, wherein the theoretical SEM diagram comprises a plurality of emoticons the correspond to the plurality of customer sentiments.

* * * * *